United States Patent
Schmitt

[11] Patent Number: 6,000,131
[45] Date of Patent: Dec. 14, 1999

[54] METHOD OF MAKING A CATALYTIC CONVERTER FOR USE IN AN INTERNAL COMBUSTION ENGINE

[75] Inventor: Paul S. Schmitt, Big Flats, N.Y.

[73] Assignee: Corning Incorporated., Corning, N.Y.

[21] Appl. No.: 08/948,188

[22] Filed: Oct. 9, 1997

Related U.S. Application Data

[60] Provisional application No. 60/027,705, Oct. 15, 1996.

[51] Int. Cl.⁶ .................................................. B23P 15/00
[52] U.S. Cl. .............................. 29/890; 29/509; 29/455.1
[58] Field of Search .................................. 29/890, 890.08, 29/446, 455.1, 509, 451; 138/147, 149, 115, 177; 422/179, 180, 178, 221, 222

[56] References Cited

U.S. PATENT DOCUMENTS

| | | | |
|---|---|---|---|
| 3,958,312 | 5/1976 | Weaving et al. | 29/157 R |
| 4,070,158 | 1/1978 | Siebels | 23/288 FC |
| 4,093,423 | 6/1978 | Neumann | 23/288 FC |
| 4,148,120 | 4/1979 | Siebels | 29/157 R |
| 4,239,733 | 12/1980 | Foster et al. | 422/179 |
| 4,397,817 | 8/1983 | Otani et al. | 422/179 |
| 4,504,294 | 3/1985 | Brighton | 55/502 |
| 4,750,251 | 6/1988 | Motley et al. | |
| 4,782,661 | 11/1988 | Motley et al. | 60/299 |
| 4,925,634 | 5/1990 | Yokokoji et al. | 422/179 |
| 4,985,212 | 1/1991 | Kawakami et al. | 422/179 |
| 5,082,479 | 1/1992 | Miller | 55/523 |
| 5,273,724 | 12/1993 | Bos | 422/179 |

FOREIGN PATENT DOCUMENTS 58-032917  2/1983  Japan .

*Primary Examiner*—S. Thomas Hughes
*Assistant Examiner*—Marc W. Butler
*Attorney, Agent, or Firm*—Timothy M. Schaeberle

[57] ABSTRACT

Disclosed is method of manufacturing catalytic converters having a ceramic honeycomb surrounded by a supporting mat and located within a housing, comprising the following steps: (1) forming a cylindrical metal shell exhibiting a uniform curvature and having a lap joint exhibiting substantially the same curvature as the outer surface of the metal shell; (2) wrapping the honeycomb in a sufficient amount of supporting mat material and inserting the wrapped honeycomb into the metal shell; (3) compressively closing the metal shell around the wrapped honeycomb thereby, eating a substantially uniform compressive stress on the honeycomb by the supporting mat.

1 Claim, 2 Drawing Sheets

– 6,000,131 –

METHOD OF MAKING A CATALYTIC CONVERTER FOR USE IN AN INTERNAL COMBUSTION ENGINE

This application claims the benefit of U.S. Provisional Application No. 60/027,705, filed Oct. 15, 1996, entitled Method of Making a Catalytic Converter for Use in an Internal Combustion Engine, by Paul S. Schmitt.

BACKGROUND OF THE INVENTION

1. Field of the Invention

The invention relates to a process for the production of catalytic converters for purifying exhaust gases, and more particularly to a method for producing the catalytic converter utilizing a pre-formed rectangular metal sheet exhibiting a substantially uniform curvature.

2. Description of the Related Art

As is well known, the purification of exhaust gases from internal combustion engines, particularly in motor vehicles, is generally achieved by an exhaust gas purification system in which a ceramic element having a honeycomb cell structure acts a catalyst carrier. More precisely, this honeycomb cell structure is covered with a catalyst which contains a precious metal which functions, in the presence of $O_2$, to convert noxious components of the exhaust gas, such as HC and CO, to $CO_2$ and $H_2O$. The honeycomb cell structure is housed within a gas-tight, sheet metal or cast-metal heat resistant housing or can.

Honeycomb structures currently employed are typically comprised of a ceramic material such as cordierite; a brittle material exhibiting limited mechanical strength. For this reason, catalytic converters in use today, typically include a supporting mat which is wrapped around the periphery of the honeycomb. This resilient material, which distributes any compressive forces uniformly on the ceramic, typically expands as the temperature increases. This being the case, the compressive supporting pressure on the honeycomb therefore increases at elevated temperatures, and in some degree compensates for the thermal expansion of the outer metal shell. Since the metal shell expands more than the enclosed ceramic honeycomb, this mat expansion with temperature rise prevents the honeycomb from becoming loose in the can shell.

There are known to the art various methods of fabricating catalytic as described above, including inserting tight-fitting mat-wrapped honeycombs into tubular shells (see, for example U.S. Pat. No. 4,093,423 (Neumann) ), as well as utilizing two metal shell halves which are closed around a mat-wrapped honeycomb and thereafter welded together; see for example U.S. Pat. No. 5,273,724 (Bos). Another such method of fabrication, commonly referred to as the "tourniquet wrap" method involves forming a rectangular flat sheet metal piece into a cylindrical body having a lap joint. A mat-wrapped honeycomb is loosely inserted into the cylindrical metal can and the combined assembly is pulled together to form the desired mat compression. Thereafter, the lap joint is welded together thereby holding the can at the desired compression while at the same time preventing gas leakage; see for Example U.S. Pat No. 5,082,479 (Miller).

The aforementioned forming of a rectangular flat sheet metal piece into a cylindrical body is usually accomplished using a three-roller sheet metal rolling device and technique. An inherent deficiency of these pre-rolled metal bodies is that the end portions of the cylindrical metal body do not have the same curvature as the middle portion of the cylindrical sheet. An outcome of using these cylindrical metal bodies, exhibiting non-uniform curvature, is that irregular gaps are formed between the honeycomb structure and the metal body or can. While the supporting mat acts to alleviate some of this non-uniformity, there is imposed upon the honeycomb non-uniform compressive loading. In those areas where the gap is the smallest, point loading leads to localized compressive failure of the honeycomb structure, i.e., crushing of the brittle honeycomb structure.

SUMMARY OF THE INVENTION

It is therefore an objective of the present invention to overcome the problems and shortcomings of the current "tourniquet wrap" method for forming catalytic converters. In other words, a method of forming catalytic converters which achieves a substantially uniform compressive load upon the honeycomb structure thereby avoiding localized compressive failure (i.e., crushing) of the honeycomb.

This objective, as well as other objectives which will become apparent in the discussion that follows, are achieved, in accordance with the present invention by utilizing a cylindrical sheet metal body exhibiting a substantially uniform curvature. Specifically, the method of manufacturing catalytic converters having a honeycomb ceramic structure surrounded by a supporting mat and located within a housing, comprises the following steps: (1) forming a cylindrical metal shell, having an inner and an outer surface both exhibiting a substantially uniform curvature, and having a lap joint having an inner surface exhibiting substantially the same curvature as the outer surface of the metal shell; (2) wrapping the honeycomb structure in a sufficient amount of supporting mat material and inserting the wrapped structure into the metal shell; (3) compressively closing the metal shell around the wrapped honeycomb thereby creating a substantially uniform compressive stress on the honeycomb by the supporting mat.

DETAILED DESCRIPTION OF THE INVENTION

Figure 1:
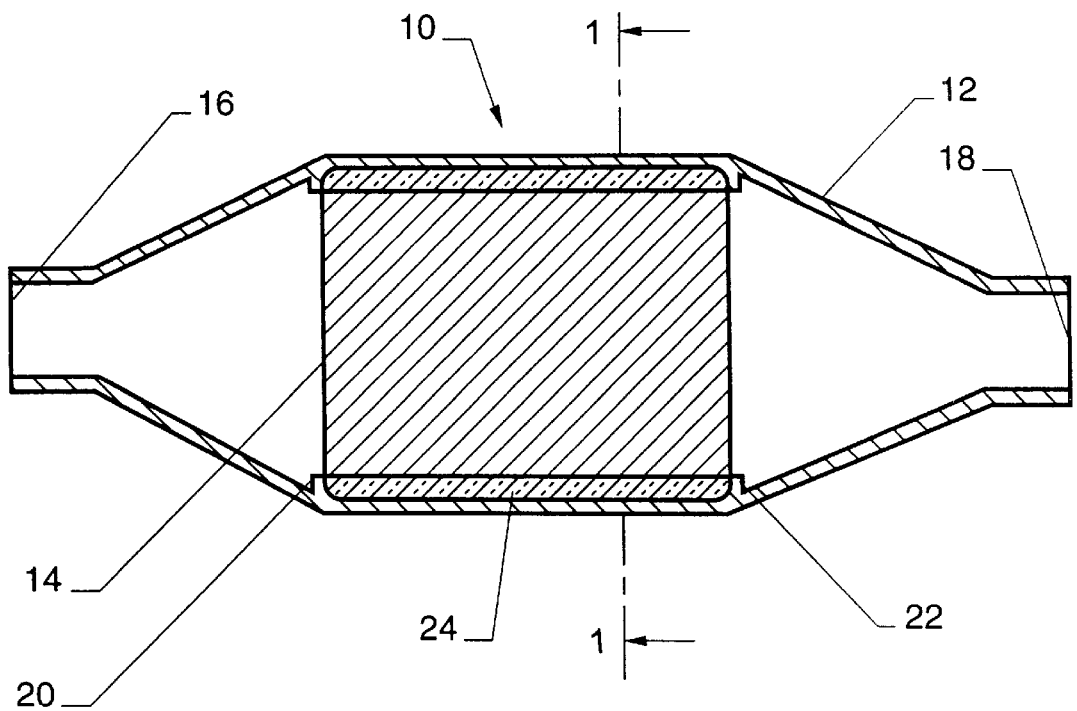
FIG. 1 is a schematic longitudinal sectional view of a catalytic converter, having a honeycomb structure, made in accordance with the method described herein.
Figure 2:
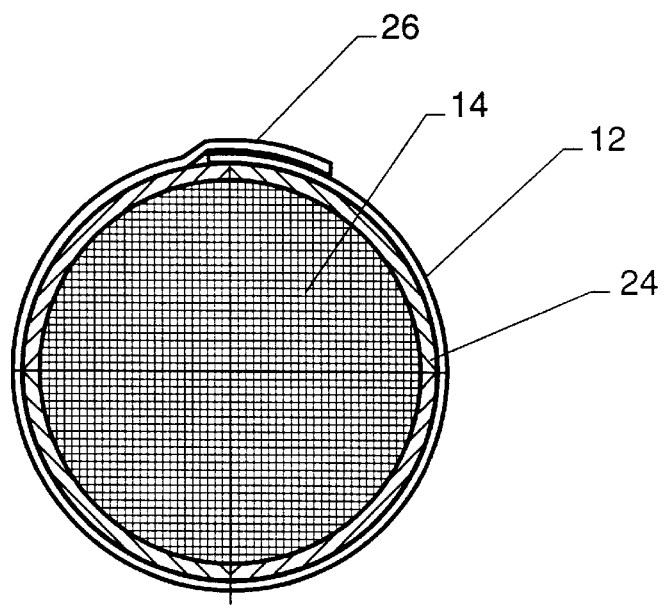
FIG. 2 is a cross-sectional view of the converter of FIG. 1 taken along the section line 1—1 of FIG. 1.

Referring now to FIGS. 1 and 2, illustrated therein is a catalytic converter which is comprised of a ceramic honeycomb structure which function, as the catalyst structure or carrier. The catalytic converter 10 comprises a cylindrical ceramic honeycomb 14 and metallic casing or can 12 enclosing the same. Can 12 is formed of a material capable of resisting under-car salt, temperature and corrosion; ferritic stainless steels including grades SS-409, SS-439, and more recently SS-441 are however, generally preferred. The choice of material depends on the type of gas, the maximum temperature and the like. Honeycomb 14 is formed by extruding a ceramic material such as cordierite. Can 12 has inlet and outlet ports 16 and 18. Gas introduced through inlet port flows through individual cells of honeycomb 14 and out through outlet port 18.

Ceramic honeycomb 14, has square cells, although the cells of the honeycomb may have shapes other than square, including triangular, rectangular and the like. In consideration of the tooling costs for extrusion molding or the like, however the cells are generally square in shape.

Ceramic honeycomb 14 is supported on a can 12 by means of ceramic fiber mat or wire mesh 24 for use as a shock absorber. Mat 24 is typically formed ceramic fiber material, either a simple non-expanding ceramic material, an intumescent materials, e.g., one which contains a vermiculite component that expands with heating to maintain firm compression when the outer steel expands outward from the ceramic monolith, as well as mats which include a combination of both. Acceptable non-expanding ceramic fiber material include ceramic materials such as those sold under the trademark "NEXTEL" by the "3M" Company, Minneapolis, Minn. or those sold under the trademark "FIBERFRAX" by the Carborundum Co., Niagara Falls, N.Y. Acceptable intumescent ceramic include ceramic materials such those sold "INTERAM" under the trademark "INTERAM" by the "3M" Company, Minneapolis, Minn. Having a width substantially equal to the length of the honeycomb 14, fiber mat 24 is interposed between 14, and is set by proper heating. The set fiber mat presses the outer periphery of the honeycomb thereby fixing it against a drag caused by the gas flow. Abutting pieces 20 and 22 protrude from the inner periphery of can 12, whereby fiber mat 24 is prevented from being longitudinally dislocated with respect to can 12 by the drag from the gas flow or associated vibrational accelerations.

The fabrication of the catalytic converter shown in FIGS. 1 and 2 generally involves the following steps: (1) forming a cylindrical metal shell exhibiting a substantially uniform curvature and having a lap joint; (2) wrapping a honeycomb substrate in a sufficient amount of supporting mat material and inserting the wrapped honeycomb into the metal shell; (3) compressively closing the metal shell around the wrapped honeycomb whereby the so-formed catalytic converter exhibits a substantially uniform compressive stress on the honeycomb by the supporting mat; and (4) securing the can ends to together at the overlap to hold compression.

Figure 3:
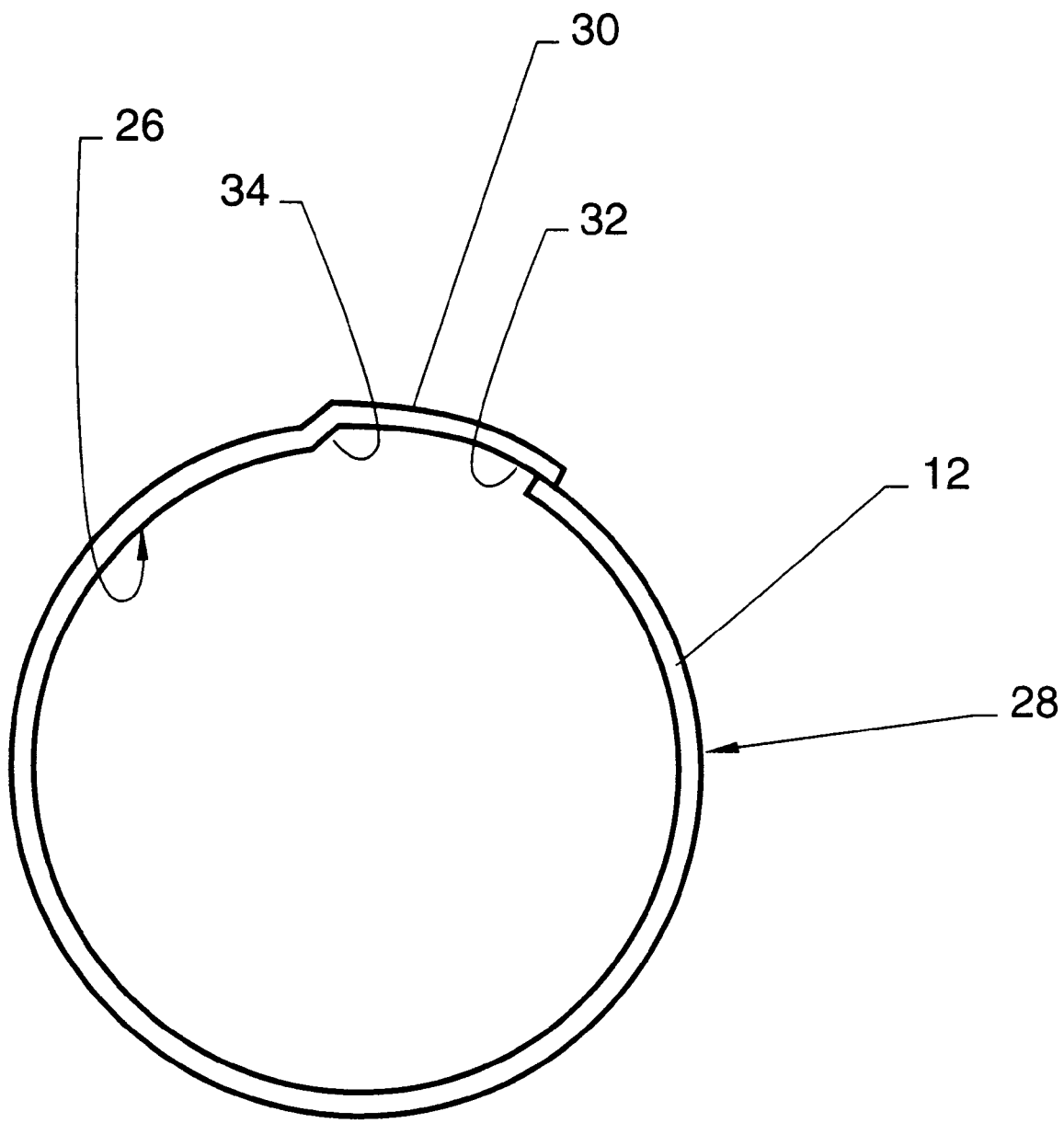
FIG. 3 is a illustration of the "uniform curvature" preformed cylindrical metal shell of FIGS. 1 and 2 prior to insertion of the honeycomb.

Referring now to FIG. 3 illustrated therein is a "uniform curvature" cylindrical metal shell 12 in its pre-compressed condition, i.e., prior to insertion of the wrapped honeycomb and the subsequent compressive closing of the metal shell to produce the so-formed catalytic converter. As shown in FIG. 3 the curvature of the inside and the outside surface, 26 and 28 respectively, of the metal shell are substantially uniform throughout their entire length. The cylindrical metal shell 12 further includes a lap joint 30 which possesses an inside surface which exhibits substantially the same curvature as that as that exhibited by the outside metal shell surface 28. The substantial similarity between the curvatures of the lap joint inner surface 32 and the metal shell outer surface 28 allows the two respective surfaces to effectively and smoothly interact during the compressive closing step. In other words, during the entire compressive closing, the metal shell outer surface 28, having a curvature, slides along the lap joint inner surface 32, having substantially the same curvature, thereby forming the catalytic converter without the development of any of the aforementioned and undesirable point loading along the lap joint overlap. Furthermore, it should be noted that another outcome of this substantial similarity of curvatures is that the resultant compressive stress upon the ceramic honeycomb by the supporting mat is uniform along the lap joint overlap.

Referring specifically now to the last step of securing of the two ends together, the preferred way of accomplishing this involves welding the inner surface of the lap joint to the outer surface of the outer metal shell to provide a gas tight seal and to hold the compressive stress.

Other desirable features of the pre-compressed cylindrical metal shell are as follow: (1) the cylindrical metal shell size and the outer lap length are such that the combination allows for a net inside diameter which is sufficient to allow insertion of the wrapped and uncompressed honeycomb; (2) the cylindrical metal shell lap joint is of such length that at closure the leading edge of the lap joint does not contact the diametral step 34 which connects the lap joint with the main body of the cylindrical metal shell.

As for the method of forming the "uniform curvature" cylindrical metal shell, it is not critical which technique is used to form the shell, only that the method used results in the formation of inner and outer surface each exhibiting a substantially uniform curvature, and a lap joint having an inner surface exhibiting substantially the same curvature as the outer surface.

One suggested method for forming the cylindrical metal shell generally involves wire cutting a pair of stamping dies into a precisely fitting, coincident pair of dies which are capable of stamping the respective ends of a metal sheet into the desired curvature. Specifically, a stamping pair would be formed for stamping one end of the cylindrical metal sheet, while a second stamping pair, with a slightly different curvature, would be formed for stamping the lap joint which is formed at the other end of the cylindrical metal sheet. After utilizing the stamping dies in order to ensure that the respective ends exhibit the desired curvature, the middle portion of the cylindrical metal sheet can be formed utilizing the aforementioned, and well known in the art, "three roll" rolling technique.

It is to be understood that the present invention is not limited to the embodiments described above, and that various changes and modifications may be effected therein by one skilled in the art without departing from the intended scope or spirit of the invention.

I claim:

1. A method of manufacturing a catalytic converter for purifying exhaust gases from an internal combustion engine, the converter having a monolithic ceramic substrate surrounded by a supporting mat and located within a housing, comprising the steps of:

stamping a first end of a rectangular metal shell to result in an inner and outer surface each having a curvature and stamping a second end of the rectangular metal shell to result in a lap joint end having an inner surface of substantially the same curvature as the outer surface of the first end and thereafter rolling the remaining non-end portions of the rectangular metal shell to result in a cylindrical metal shell, having an inner and outer surface each exhibiting a substantially uniform curvature, and having lap joint ends having an inner surface exhibiting substantially the same curvature as the outer surface of the metal shell;

wrapping the substrate in a sufficient amount of supporting mat material and inserting the wrapped substrate into the metal shell;

compressively closing the metal shell around the wrapped substrate so that a substantially uniform compressive stress is exhibited on the substrate by the supporting mat; and securing the inner surface of the lap joint to the outer surface of the outer metal shell to provide a gas tight seal and to hold the compressive stress to thereby form a catalytic converter.

* * * * *